United States Patent
Vetrini

(10) Patent No.: US 12,145,334 B2
(45) Date of Patent: Nov. 19, 2024

(54) PROCESS FOR AUTOMATICALLY GLUING PHOTOCHROMIC LENSES AND POLARIZED PHOTOCHROMIC LENSES

(71) Applicant: BARBERINI S.P.A., Silvi (IT)

(72) Inventor: Gianni Vetrini, Silvi (IT)

(73) Assignee: BARBERINI S.P.A., Silvi (IT)

( * ) Notice: Subject to any disclaimer, the term of this patent is extended or adjusted under 35 U.S.C. 154(b) by 314 days.

(21) Appl. No.: 17/611,637

(22) PCT Filed: May 18, 2020

(86) PCT No.: PCT/IT2020/050124
§ 371 (c)(1),
(2) Date: Nov. 16, 2021

(87) PCT Pub. No.: WO2020/234909
PCT Pub. Date: Nov. 26, 2020

(65) Prior Publication Data
US 2022/0242075 A1   Aug. 4, 2022

(30) Foreign Application Priority Data

May 17, 2019 (IT) .......................... 102019000006973

(51) Int. Cl.
*B29D 11/00* (2006.01)
*G02B 5/30* (2006.01)

(52) U.S. Cl.
CPC .. *B29D 11/00653* (2013.01); *B29D 11/00403* (2013.01); *B29D 11/00423* (2013.01); *B29D 11/00644* (2013.01); *G02B 5/3033* (2013.01)

(58) Field of Classification Search
None
See application file for complete search history.

(56) References Cited

U.S. PATENT DOCUMENTS 5,851,328 A    12/1998  Kohan
6,428,301 B1    8/2002  Fukuma et al.
(Continued)

FOREIGN PATENT DOCUMENTS

EP    3396439 A1    10/2018
WO    WO-9954118 A1    10/1999

OTHER PUBLICATIONS

International Search Report issued Oct. 8, 2020 in PCT/IT2020/050124, 5 pages.
(Continued)

*Primary Examiner* — Barbara J Musser
(74) *Attorney, Agent, or Firm* — Element IP, PLC

(57) ABSTRACT

A process for automatically gluing a photochromic lens, includes: supplying an adhesive comprising photochromic molecules; supplying an external lens; supplying a polarizing film from a reel; forming the polarizing film on a spherical mold; applying a first portion of the adhesive to the polarizing film positioned on the spherical mold; compressing the polarizing film and the external lens, while measuring a thickness of the first portion of the adhesive therebetween; supplying an internal lens; applying a second portion of the adhesive to the internal lens; compressing the internal lens and the external lens having the polarizing film formed thereon, while measuring a thickness of the second portion of the adhesive therebetween using a measuring device; stopping the compression of the internal lens and the external lens; cutting excess polarizing film; and catalyzing the adhesive to form the glued photochromic lens.

21 Claims, 2 Drawing Sheets

(56) References Cited

U.S. PATENT DOCUMENTS

Figure 1:
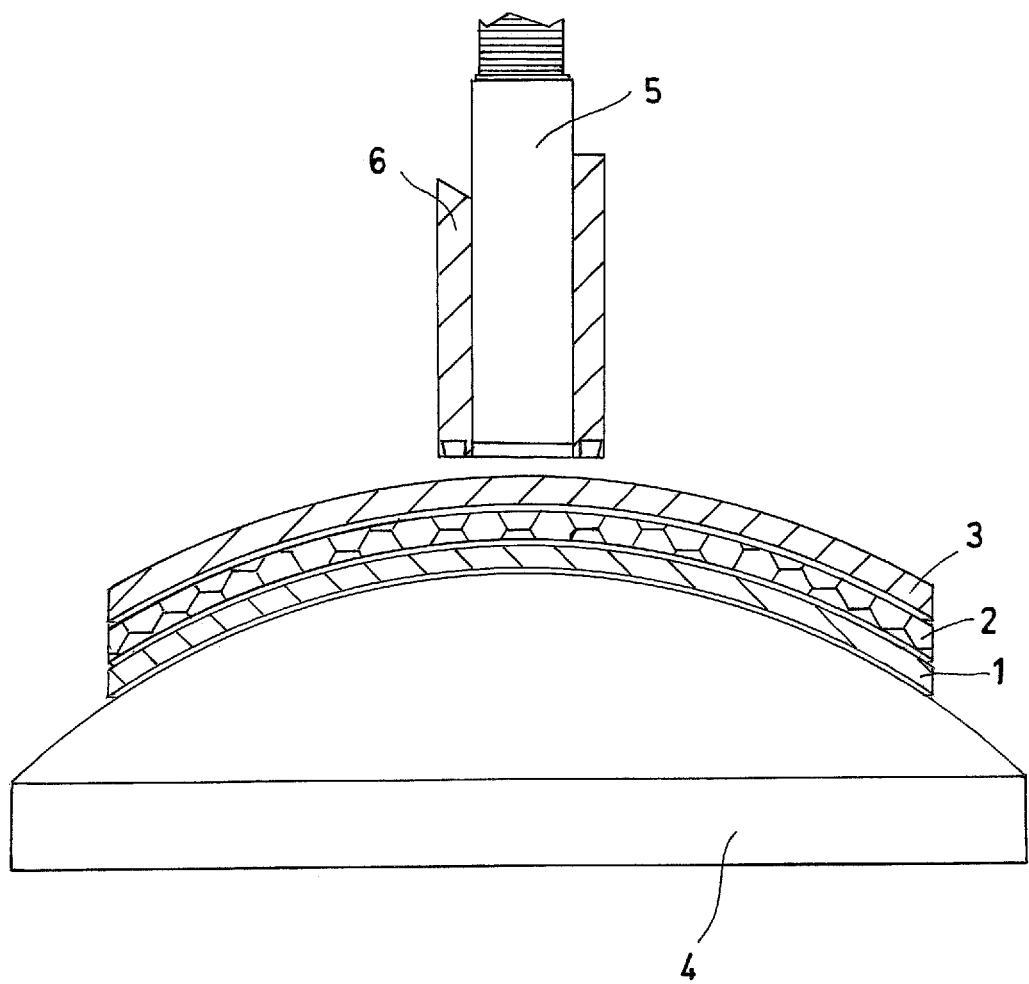

| | | | |
|---|---|---|---|
| 6,716,294 B1 * | 4/2004 | Vetrini | B29D 11/00423 |
| | | | 156/559 |
| 2019/0048237 A1 | 2/2019 | Fan et al. | |

OTHER PUBLICATIONS

Written Opinion issued Oct. 8, 2020 in PCT/IT2020/050124, 6 pages.

* cited by examiner

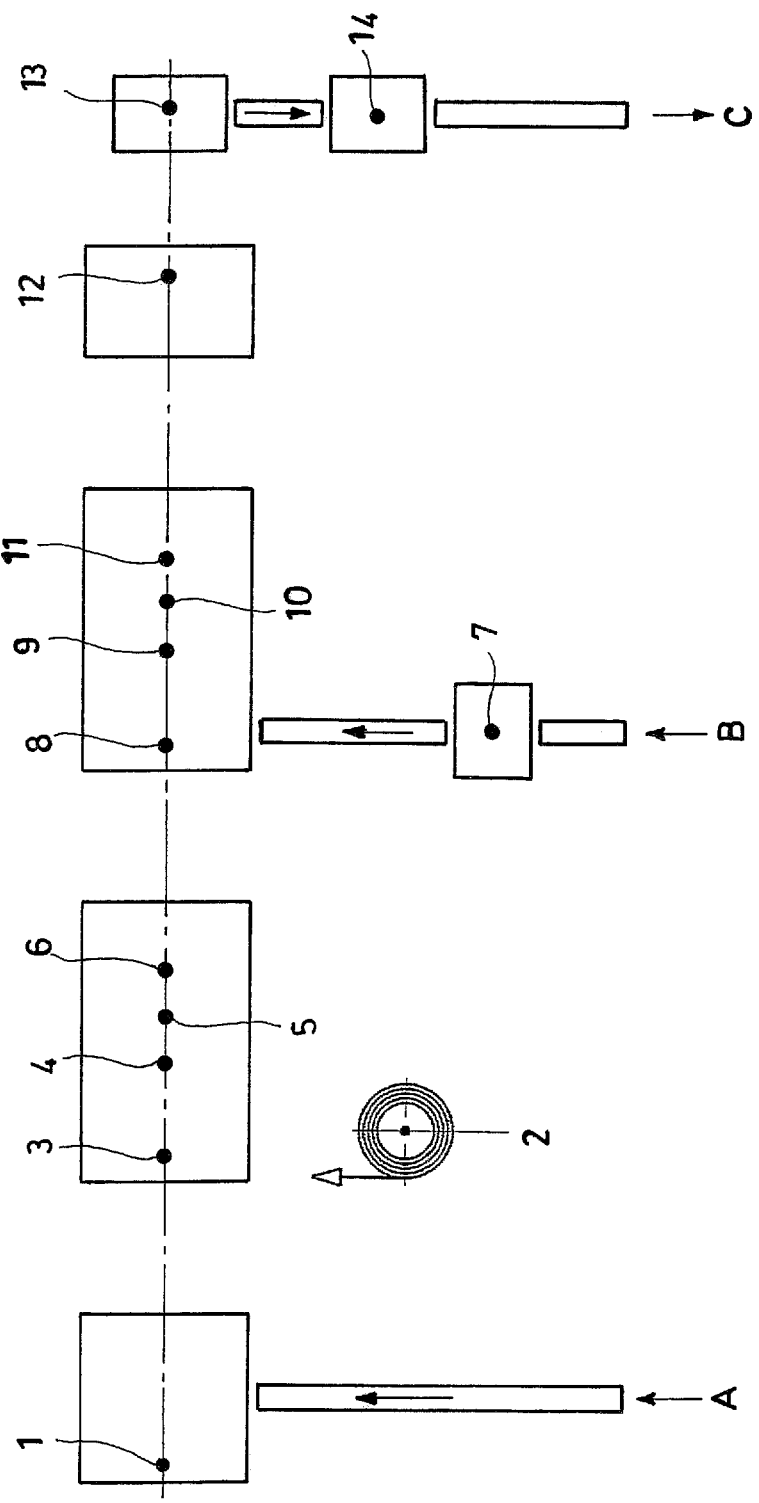

PROCESS FOR AUTOMATICALLY GLUING PHOTOCHROMIC LENSES AND POLARIZED PHOTOCHROMIC LENSES

This application is the U.S. National Stage of International Application No. PCT/IT2020/050124, filed May 18, 2020, and this application claims priority to Italian Patent Application Ser. No. 102019000006973, filed May 17, 2019.

This invention concerns a process and a system for automatically gluing photochromic lenses and polarized photochromic lenses.

The invention also concerns photochromic lenses and glass polarized photochromic lenses obtained with said system and with said process, in particular lenses oriented by degrading and/or in any case non-uniform coatings, i.e. oriented for the geometry of the lens (decentred), in which the optical centre does not coincide with the geometrical centre of the lens itself.

It is well known to all experts in the field of polarized lenses, how visible light is composed of electromagnetic waves that have a wavelength approximately between 380 and 780 nm.

Other features of light radiation are the intensity of the radiation and the geometry of the oscillation of the electromagnetic wave.

For the geometry of the oscillation, also called "polarization", this can take place in randomly oriented planes, called "random polarization" or "non-polarized", or in a single plane ("linear polarization"), or within a cylindrical surface ("circular polarization").

In nature, light normally contains a certain fraction of polarized light. Reflection on reflective surfaces (glass windows, bodies of water, snowy or icy surfaces, shiny or wet asphalt, micro-drops of water suspended in the air) with appropriate angles, produces a certain degree of polarization.

The effect is that of a glare that comes from the area of the surface where the polarized reflection is at its highest, so there is a considerable disturbance of vision caused by the strong reflection. For example, this effect on water surfaces prevents seeing below the free surface.

Polarized lenses are able to filter direct light like a normal "sunglass" lens and to eliminate (according to a certain degree of efficiency) particularly annoying reflected polarized light.

The main comfort resulting from these lenses consists in the elimination of the annoying reflections normally present on the surface of glass windows, ponds, frozen surfaces and paved roads.

Glass polarized lenses for glasses generally consist of two thin lenses, also called glass caps, between which the polarizing film is interposed.

Lenses and film are held together by an adhesive applied to both sides of the film. In other words, a "pack" of 5 layers is made, respectively external or "convex" lens, glue, polarizing film, glue, internal or "concave" lens.

Other external and internal layers may consist of surface treatments (coating) to give the lenses special aesthetic or mechanical properties.

The optical properties of the entire assembled lens depend on the properties of the individual layers and also on the geometric precision of the assembly. A non-uniform amount of glue, or a non-parallelism between the various layers, produces undesirable optical effects for the quality of the finished product (aberrations, distortions and loss of optical definition).

This step is followed by the catalysing of the adhesive; typically UV catalytic resins are used, but other types of resin can also be used. This type of solution does not ensure the concentricity of the spherical surfaces of the filtering and transparent layers, and therefore of the liquid (adhesive) layers before catalysing, thus creating the above-mentioned problems.

Manual assembly operations are very expensive as they require very long operations carefully carried out by expert personnel to avoid and eliminate the air bubbles that are produced when the lenses are placed on the adhesive, and present in the adhesive itself.

In general, the technology used to date for gluing lenses involves forming the polarizing film using different methods and then gluing it manually after applying adhesive to the two surfaces of the film.

Subsequently, the adhesive is catalysed using UV lamps or other types of resin.

In order to overcome the drawbacks of the above-mentioned technology, at the end of the nineties the same Applicant proposed a system and a process for automatically gluing polarized lenses, patented by the same Applicant through Italian Patent Application Nos. RM98A000241 and RM98A000525, and International Patent Application WO9954118 (hereinbelow referred to as solution Barberini WO'118), in which the system provided for a supply station of the polarizing film on a reel; a supply station of glass convex lenses; a supply station of concave lenses; a vacuum forming station of the film on spherical moulds; a station for depositing and gluing external convex lenses; a station for translating pre-glued lenses; a station for depositing and gluing internal concave lenses; a station for separating and cutting the excess film from the individual lenses; and a palletizing station of finished polarized lenses.

The process in Barberini WO'118 involved the steps of supplying a polarizing film on a reel; supplying glass convex lenses, supplying concave lenses; vacuum forming the film on spherical moulds; depositing and gluing the convex external lenses, translating the pre-glued lenses; depositing and gluing the concave internal lenses; separating the lenses and eliminating the excess film from the individual lenses; palletizing the finished polarized lenses.

The innovative solution introduced by Barberini WO'118 resided in particular in the possibility of bending the film over a metal mould and positioning and gluing the first lens, overturning and gluing the second lens with a procedure very similar to the first step, with assembly precision of the pack.

Moreover, another remarkable improvement of the patented solution in Barberini WO'118 was the solution to the problem that since the geometry of the "adhesive-polarizing-film-adhesive" system was not consistent (about one tenth of thickness), and therefore it did not have its own rigidity before the resin catalysed. In addition, the separation surfaces between the lens elements of previous technologies did not guarantee optical surfaces (separation between the various layers) free of aberration defects. In fact, Barberini WO'118 overcame this problem with the new technology, catalysing the resin and the film over a metal reference mould, with glass lenses.

In particular as said, in the previous system according to Barberini WO'118, after a robot positions one lens on the other, with resin and polarizing film in between, a pressure is applied to the upper lens in order to bring the two glass caps together, making the adhesive flow regularly towards the edge of the lens. The operation ends when the adhesive has reached the edge uniformly, followed by radiation with UV rays to catalyse the adhesive.

In the solution according to Barberini WO'118, it was not necessary to check the thickness of the adhesive, as it was not a decisive condition for the overall accuracy of the lens.

A method was recently proposed on the market for making photochromic lenses (transmission of the lens inversely proportional to the incident light) by means of photochromic chemical molecules (additives) that, dispersed in a transparent medium, give the same the power of photochromatism.

In particular, the possibility of the lenses to transmit light inversely proportional to the incident light, changing colour.

In view of this new proposal, the Applicant has studied how to transfer the photochromic effect to polarized and non-polarized lenses using the technique of dispersion of organic and/or inorganic photochromic molecules in the adhesive in order to obtain a polarized lens with photochromic effect.

Furthermore, the Applicant has realized that by using the same technique of gluing two lenses together (without the polarizing film or with a colourless, non-polarizing film), a standard lens with a photochromic effect can be obtained at a low cost.

The solution proposed according to this invention allows many colours of photochromic lenses to be obtained, the final colour of the lens depending also on the colour of the photochromic filter both in the activated and in the rest state.

Further, according to this invention, the effect of obtaining a lens of one colour in the non-excited state is obtained, while a second colour in the excited state can be obtained when the lens is dark, thus creating a completely new lens on the market.

In order to obtain the photochromic effect, i.e. the consistency of the colour and its uniformity, it is necessary for the thickness of the adhesive layers to be strictly checked, as the effect of photochromatism in this case strictly depends on the thickness of the adhesive, and therefore on its overall reaction to sunlight.

The previous patent did not include this feature since the completely transparent and colourless adhesive did not affect the final colour of the lens.

It was therefore necessary to devise a system that is able to measure the thickness of the meatus created between the lenses and which defines the thickness of the adhesive. These and other results are obtained according to this invention by using an optical sensor able to read the distance between the surfaces of the spherical glass caps between which the adhesive is confined so that when a well-defined height is reached, the pressure of the presser that moves the two lenses close to each other is interrupted and the adhesive is catalysed, thus obtaining a monolith in which the layer of photochromic adhesive has a defined and stable thickness.

Therefore, an innovative photochromic lens is obtained with the solution according to this invention.

A further result that is obtained with the solution proposed according to this invention is to be able to insert a polarizing film in the adhesive thickness to obtain a polarized-photochromic lens.

The specific object of this invention is therefore a process for automatically gluing photochromic lenses, characterized in that it includes the following steps:
  a) supplying an adhesive containing photochromic molecules;
  b) supplying an external lens;
  b1) supplying a polarizing film on a reel adapted to be deposited on the external lens;
  b2) forming said polarizing film on spherical moulds, said polarizing film being positioned and glued with said suitably-dosed adhesive containing photochromic molecules, on the external lens;
  b3) compressing said elements and measuring the adhesive thickness;
  c) supplying an internal lens;
  d) depositing the suitably-dosed adhesive containing photochromic molecules, on the internal lens;
  e) approaching the two lenses together so as to compress the adhesive and to distribute it uniformly on the surface of the lenses;
  at the same time, measuring through a measuring device, the thickness of the adhesive layer containing photochromic molecules;
  f) stopping the approaching of the lenses once the desired thickness of the adhesive layer is obtained;
  f1) cutting the excess polarizing film;
  g) catalysing the lenses.

Furthermore according to the invention, said photochromic molecules may be organic and/or inorganic.

Again according to the invention, the amount of photochromic molecules in the adhesive may vary depending on the adhesive thickness.

Also according to the invention, the measuring device can be an optical sensor.

Further according to the invention, said depositing and gluing steps of said convex lenses and of said concave lenses can provide an approaching movement of the lens to the glue droplet so as to create a substantially point-like contact between the lens and the glue, and with a coupling speed as a function of the surface tension of the droplet so that the expansion front of the droplet does not close on itself, trapping air.

Preferably according to the invention, the lens can be brought closer to the droplet by means of vertical pressure for the preliminary spreading of the glue.

In particular according to the invention, a final automatic testing step of the finished product can be provided.

More specifically according to the invention, pressure may be applied to all or part of the lens surface during said gluing step.

Again according to the invention, said process can include a measurement step by means of one or more further optical measuring devices, in series with said steps of supplying the lenses, before said step of gluing said lenses, in order to identify any geometric defects (curvature, thickness, asphericity, etc.), said measurement step being followed by a step of removing said lenses having geometrical defects.

Again according to the invention, said process may include pre-catalysing steps subsequent to steps b3) and e).

Moreover according to the invention, said polarizing film can be on reels from which said film is unwound in order to be glued to said lenses, said polarizing film having a precise polarization axis.

Preferably according to the invention, said process can include, after said step b) of supplying said external lenses, an orientation step, for oriented coating applications, such as for example the degrading coatings, or for applications with decentralized lenses, in which the optical centre does not coincide with the geometrical centre, by marking references on said lens by means of temporary paints.

Moreover according to the invention, said references can be marked on the edges of the lenses, preferably in an area which will subsequently be removed during shaping.

Furthermore according to the invention, said process can include a step of detecting and recognizing said references followed by a step of possible rotation of the lens according to the angle necessary to place the lens on the film according to the orientation of the polarization axis thereof.

Preferably according to the invention, said step of detecting and recognizing said applied references can take place via camera systems.

Again according to the invention, said orientation step of the polarization axis can take place both for said external lens and said internal lens.

Again according to the invention, said polarizing film can be supplied with a protection support to be collected, when separated, on a suitable reel.

In particular according to the invention, in order to give the finished lens particular features, polarizing films can be used which have one or more of the following additional properties:
- UV-blocking, i.e. a transmission close to 0% of UV radiation up to 400 nm;
- high efficiency, i.e. high absorption difference of polarized light;
- black-crossing, i.e. minimum variation of the colour tone of the polarized light.

More specifically according to the invention, in order to give the finished lens particular features, adhesives can be used which have one or more of the following additional properties:
- UV-blocking, i.e. a transmission close to 0% of UV radiation;
- high protection of the film against aging and discoloration (a feature largely linked to UV ray absorption, as the glue covers the film on the two surfaces;
- high resistance to breaking due to shocks so as to be able to easily meet the resistance requirements set by international standards;
- high resistance to delamination, i.e. better adhesiveness on the glass surface and film, in order to withstand the aggression of external physical-chemical agents (such as humid and/or hot atmospheres, salty atmospheres, etc.);
- ability to catalyse at a longer wavelength (in particular also beyond the UV rays), so that it can be catalysed by lamps with a broad spectrum of emission even in the presence of layers that block the UV rays (such as some types of polarizing films and some types of glass or coating).

Moreover according to the invention, to allow the catalysing also in the case of layers that block the UV rays (such as some types of polarizing films and some types of glass or coating), lamps having a broad spectrum of emission can be used, preferably in combination with special adhesives.

Moreover, the object of this invention is a system for making a lens using the process described.

Again according to the invention, said system can provide a rigid support on which said lenses can be positioned during the process and on which said measuring device is arranged, preferably an optical sensor, for the measuring steps, and a presser for the compression steps.

Finally, the object of this invention is a photochromic lens made with the described process or the described system.

In particular according to the invention, said internal lens and said external lens can be glass lenses.

This invention is now described, by way of example and without limiting the scope of the invention, according to a preferred embodiment thereof illustrated in the accompanying drawings, in which:

FIG. 1 shows a sectional view of an embodiment of the system for realising the perfected process for automatically gluing photochromic lenses and polarized photochromic lenses according to the invention; and FIG. 2 shows a block diagram of the steps of the perfected process for automatically gluing lenses according to the invention.

FIG. 1 shows the final step of the process according to the invention. As noted in such final step, the internal lens 1—adhesive 2—external lens 3 pack is placed on a rigid support 4. There is a measuring device 5 above the rigid support 4, preferably an optical sensor 5 and a presser 6.

These elements are preferably coupled together in such a way as to ensure greater precision during the process, in particular of measuring the adhesive thickness of the adhesive 2 during compression.

In particular, the steps of the process are as follows:
a) supplying an adhesive 2 containing photochromic, organic and/or inorganic molecules;
b) supplying an external lens 3;
c) supplying an internal lens 1;
d) depositing the suitably-dosed adhesive 2 containing photochromic molecules, on the internal lens 1;
e) approaching the two lenses 1 and 3 together so as to compress the adhesive 2 and to distribute it uniformly on the surface of the lenses 1 and 3; at the same time, measuring through a measuring device 5, the thickness of the adhesive layer 2 containing photochromic molecules;
f) stopping the approaching of the lenses 1 and 3 once the desired thickness of the adhesive layer 2 is obtained; and
g) catalysing the lenses 1 and 3.

The lenses 1 and 3 used are made of glass but the same process can be applied to lenses made of any other material.

These depositing and gluing steps of the convex lenses and of the concave lenses provide an approaching movement of the lens to the glue droplet so as to realise a substantially point-like contact between the lens and the glue, and with a coupling speed as a function of the surface tension of the droplet so that the expansion front of the droplet does not close on itself, trapping air.

In particular, the lens is brought closer to the droplet by means of vertical pressure for the preliminary spreading of the glue.

Advantageously, an automatic testing step of the finished product is also provided.

During the gluing step, the application of pressure applied on all or part of the surface of the lens, is provided.

Furthermore, a measurement step by means of one or more further optical measuring devices is provided, in series with the supply of the glass lenses and before gluing said lenses, in order to identify any geometric defects (curvature, thickness, asphericity, etc.), followed by a step of removing the lenses having geometrical defects.

In particular, the process can be applied to make polarized photochromic lenses, adding steps to the basic process in order to provide the insertion of a polarizing film between the two lenses. In such a case, the process according to the invention would include, between said steps b) and c), a step
b1) of supplying a polarizing film on a reel adapted to be deposited on the external lens.

In addition, after said step b1) and before said step c), a step would be included
b2) of forming said polarizing film on spherical moulds, the polarizing film being positioned and glued with the suitably-dosed adhesive containing photochromic molecules, on the external lens, followed by a step b3) of compression of said elements and of measuring the adhesive thickness, and a step f1), after step f), of cutting the excess film.

Advantageously, the process includes pre-catalysing steps following steps b3) and e).

An orientation step of the lenses to improve the checking of the polarization axis was also included in the process according to the invention.

Indeed, it is known that the polarized lens must be mounted on the glasses with a perfect orientation of the lens with respect to its polarization axis. ISO Standard No. 12312-1 2013 (B5, pg. 20) defines angles and tolerances.

Until now, when making polarized glass lenses, it was necessary to have a second tool/system capable of detecting the polarization axis and then marking the lens appropriately so that it could be shaped in the glasses with precise references.

In the process conceived, the film has a precise polarization axis because it was wound directly by the system that makes the polarizing film by stretching and colouring with special dyes. The stretching axis is also the polarization axis. Therefore, a perfectly oriented film is arranged.

Then there is included, after said step of supplying said lenses and before said gluing step, an orientation step (for oriented coating applications, such as for example the degrading coatings, or for applications with decentralized lenses, in which the optical centre does not coincide with the geometrical centre) by marking references on the lens by means of temporary paints. Preferably, the lens is marked in an area which will subsequently be removed during shaping.

This ensures error-free marking of the polarization axis on the lens, which will be identified by the references applied just before it is glued to the film, thus without any possibility of introducing geometric positioning errors.

Typically both the external and internal glass cap can be oriented, i.e. they have features that do not allow them to be mounted on the polarizing film without taking into account their optical/geometric features.

By way of non-exhaustive example, in the case of:
caps with a degrading coating (shading) applied, i.e. with a well-defined reference axis
off-centre, i.e. prismatic, caps to correct an optical-geometric error in particularly wrap-around glasses
etc.

The gluing system according to this invention was therefore equipped with recognition systems, e.g. cameras, capable of recognizing the applied markings and rotating the lens according to the angle necessary to place the lens on the film according to the orientation of the polarization axis thereof, as described above.

This device was implemented for both the external and internal lens.

The film is supplied with a protection support to be collected, when separate, on a specific reel.

In order to give the finished lens particular features, polarizing films can be used which have one or more of the following additional properties:
UV-blocking, i.e. a transmission close to 0% of UV radiation up to 400 nm;
high efficiency, i.e. high absorption difference of polarized light;
black-crossing, i.e. minimum variation of the colour tone of the polarized light.

Moreover, further adhesives can be applied which have one or more of the following additional properties:
UV-blocking, i.e. a transmission close to 0% of UV radiation;

high protection of the film against aging and discoloration (a feature largely linked to UV ray absorption, as the glue surrounds the film on the two surfaces;
high resistance to breaking due to shocks so as to be able to easily meet the resistance requirements set by international standards;
high resistance to delamination, i.e. better adhesiveness on the glass surface and film, in order to withstand the aggression of external physical-chemical agents (such as humid and/or hot atmospheres, salty atmospheres, etc.);
ability to catalyse at a longer wavelength (in particular also beyond the UV rays), so that it can be catalysed by lamps with a broad spectrum of emission even in the presence of layers that block the UV rays (such as some types of polarizing films and some types of glass or coating).

To allow the catalysing also in the case of layers that block the UV rays (such as some types of polarizing films and some types of glass or coating), lamps having a broad spectrum of emission are used, preferably in combination with special adhesives.

The Barberini WO'118 solution provides a step in which the two lenses, with the film already positioned and the adhesive still in the liquid phase, are joined and pressed in a controlled way by a mechanism that stops its compression stroke after a given time during the fine-tuning step. Barberini WO'118 guarantees the perfect distribution of the resin over the surface, typically alongside and dosed on a point of the lens surface, but not the measurement of its thickness.

Measuring devices for transparent layers of material have been introduced on the market: glass, plastic resins, etc. with optical (laser) beams capable of detecting the thickness between the separating surfaces of a transparent pack of various materials, or even of the same material but separated by adjacent surfaces.

By using these new technologies, it is possible to determine the thickness of the liquid resin during compression step between the glass lenses, until a specific thickness is reached, and then proceeding to the final catalysing of the pack.

This invention therefore proposes a mechanical modification to Barberini WO'118 in such a way as to accommodate the measurement system and to measure the meatus, and also if preferred, the geometric errors of the meatus, before proceeding to the final catalysing of the resin.

In this way, it is possible to make polarized and non-polarized lenses with colouring and transmission in the excited, uniform and measured state. The final lens obtained can be polarized if a polarizing film is inserted in the lens pack, or non-polarizing if no film or a non-polarizing film is inserted in the pack (e.g.: coloured or colourless film).

Making the innovative lens according to the invention involves checking the thickness of the resin layer before its final catalysing.

Indeed, different thicknesses of resin, even minimal, result in a different colouring (transmission) due to the fact that the transmission of the photochromic medium (catalysed adhesive) is a function of the layer of photochromic material (molecules) dispersed in it.

In other words, an indirect measurement of the amount of photosensitive molecules in the resin layer, is provided.

It is also clear that checking the thickness of glass lenses is something quite different from checking a layer of liquid prior to the catalysing on which the photochromic effect will then depend.

In a pair of glasses, indeed the two lenses must be the same colour in both the excited and the resting state.

With the solution according to this invention, the meatus between the two caps, with or without the polarizing film layer, can be variable, and therefore the thickness of the resin can affect the colour and transmission of the lens.

With the solution proposed according to this invention, it is possible to approach the two glass lenses with the resin interposed, which once catalysed, creates a monolithic lens (with or without polarizing film incorporated in the resin).

In Barberini WO'118, a known quantity of adhesive is dosed, making sure that it is evenly distributed over the surface of the lens up to the edge, but determining the adhesive thickness is not provided.

Moreover, according to the invention, the two lens surfaces on the gluing side (concave on the external lens and convex on the internal one) must have the same curvature (radius).

The surfaces to be glued together must be perfectly spherical and the thickness of the meatus, occupied by the adhesive, must be as regular as possible and have a constant thickness. This ensures that any photochromic adhesive will have a uniform optical effect on the surface and also that the left lens and the right lens will have the same colouring and transmission. This can only be achieved if the meatus is repetitive (thickness) and constant. This invention achieves precisely this fundamental feature of measuring the thickness, and thus of checking it.

It is understood that the external surfaces of the lens may also be aspherical, i.e. have decentralization to obtain optical effects well known in the world of sunglasses. Only the contact surfaces and the resulting meatus is perfectly spherical and the thickness of the meatus is checked.

A specific embodiment of the process the object of the invention is illustrated in the block diagram in FIG. 2.

The following steps can be identified:
A. supplying 0.80-1.00 thin glass lenses (caps), external lens including any coatings;
B. supplying 0.80-1.00 thin glass lenses, internal lens;
C. extracting polarized glass lens obtained by gluing the caps to the polarizing film, including any coatings.

The numbered steps correspond to:
1. vision step for determining lens orientation, along a vertical axis (typically: decentralized, degrading coatings);
2. supplying PVA polarizing film from a reel, simultaneous separation of the protective film;
3. forming the film according to a spherical surface, gluing and positioning the external lens;
4. dosing the adhesive with possible photochromic effect;
5. pack compression: lens and film with adhesive interposed and progressive measurement of meatus/adhesive thickness;
6. pre-catalysing the adhesive;
7. vision station for lens orientation along a vertical axis (typically: decentralizing, degrading coatings)
8. applying the internal lens;
9. dosing the adhesive with possible photochromic effect;
10. package compression: lens-film-lens, and progressive measurement of meatus/adhesive thickness;
11. pre-catalysing the adhesive;
12. cutting the excess film;
13. final catalysing;
14. testing the lenses.

The principle was described of making the system for assembling a composite glass lens (typically two caps), checking the thickness of the adhesive applied, with a polarizing film interposed or without any other film with optical features.

According to one aspect of this invention, a process can be provided for automatically gluing photochromic lenses characterized in that it includes the following steps:
a) supplying an adhesive containing photochromic molecules;
b) supplying an external lens;
c) supplying an internal lens;
d) depositing the suitably-dosed adhesive containing photochromic molecules, on the internal lens;
e) approaching the two lenses together so as to compress the adhesive and to distribute it uniformly on the surface of the lenses;
at the same time, measuring through a measuring device, the thickness of the adhesive layer containing photochromic molecules;
f) stopping the approaching of the lenses once the desired thickness of the adhesive layer is obtained;
g) catalysing the lenses.

In particular, according to a further aspect, said process may include between said steps b) and c), a step b1) of supplying a polarizing film on a reel adapted to be deposited on the external lens.

According to a further aspect, said process may include, after said step b1) and before said step c), a step b2) of forming said polarizing film on spherical moulds, said polarizing film being positioned and glued with said suitably-dosed adhesive containing photochromic molecules, on the external lens, followed by a step b3) of compression of said elements and of measuring the adhesive thickness and a step f1), after step f), of cutting the excess film.

Furthermore in a further aspect, said process may include one or more of the features described above.

The present invention is described by way of example only, without limiting the scope of application, according to its preferred embodiments, but it shall be understood that the invention may be modified and/or adapted by an expert in the field without thereby departing from the scope of the inventive concept, as defined in the claims herein.

The invention claimed is:

1. A process for automatically gluing a photochromic lens, comprising:
supplying an adhesive comprising photochromic molecules;
supplying an external lens;
supplying a polarizing film from a reel;
forming the polarizing film on a spherical mold;
applying a first portion of the adhesive to the polarizing film positioned on the spherical mold;
compressing the polarizing film and the external lens, while measuring a thickness of the first portion of the adhesive therebetween;
supplying an internal lens;
applying a second portion of the adhesive to the internal lens;
compressing the internal lens and the external lens having the polarizing film formed thereon, while measuring a thickness of the second portion of the adhesive therebetween using a measuring device, to uniformly distribute the second portion of the adhesive as an adhesive layer between the internal lens and the external lens;
stopping the compression of the internal lens and the external lens once a desired thickness of the adhesive layer is obtained;

cutting excess polarizing film; and catalyzing the adhesive to form the glued photochromic lens.

2. The process according to claim 1, wherein the photochromic molecules comprise at least one selected from the group consisting of organic photochromic molecules and inorganic photochromic molecules.

3. The process according to claim 1, wherein a quantity of photochromic molecules in the adhesive varies with adhesive thickness.

4. The process according claim 1, wherein the measuring device comprises an optical sensor.

5. The process according to claim 1, wherein:
applying the first portion of the adhesive to the polarizing film comprises applying a first droplet of adhesive, and compressing the polarizing film and the external lens commences with an approaching movement of the external lens to the first droplet to make a substantially point contact between the external lens and the first droplet and continues at a speed related to a surface tension of the first droplet so that an expansion front of the first droplet does not close on itself, trapping air; and
applying a second portion of the adhesive to the internal lens comprises applying a second droplet of adhesive, and compressing the internal lens and the external lens having the polarizing film formed thereon commences with an approaching movement of the external lens to the second droplet to make a substantially point contact between the external lens and the second droplet and continues at a speed related to a surface tension of the second droplet so that an expansion front of the second droplet does not close on itself, trapping air.

6. The process according to claim 5, wherein:
compressing the polarizing film and the external lens comprises application of a vertical pressure to spread the first droplet of the adhesive; and
compressing the internal lens and the external lens having the polarizing film formed thereon comprises application of a vertical pressure to spread the second droplet of the adhesive.

7. The process according to claim 1, further comprising final automatic testing of the glued photochromic lens.

8. The process according to claim 1, wherein:
compressing the polarizing film and the external lens comprises application of pressure to all or part of a surface of the external lens; and
compressing the internal lens and the external lens having the polarizing film comprises application of pressure to all or part of a surface of the external lens.

9. The process according to claim 1, wherein:
supplying the external lens comprises measuring a candidate external lens with a first optical measuring device to identify a first geometric defect, removing the candidate external lens if the geometric defect is present and supplying the candidate external lens if the first geometric defect is not present; and
supplying the internal lens comprises measuring a candidate internal lens with a second optical measuring device to identify a second geometric defect, removing the candidate internal lens if the second geometric defect is present and supplying the candidate internal lens if the second geometric defect is not present.

10. The process according to claim 1, further comprising:
pre-catalyzing the first portion of the adhesive after compressing the polarizing film and the external lens; and
pre-catalyzing the second portion of the adhesive after compressing the internal lens and the external lens having the polarizing film formed thereon.

11. The process according to claim 1, wherein supplying the polarizing film from the reel comprises supplying a polarizing film wound to have a precise polarization axis.

12. The process according to claim 1, further comprising:
orienting the external lens for at least one selected from the group consisting of application of an oriented coating and incorporation in a decentralized lens in which an optical center does not coincide with a geometrical center;
wherein:
orienting the external lens is performed after supplying the external lens; and
orienting the external lens comprises marking a reference on the external lens with a temporary paint.

13. The process according to claim 12, wherein the reference is applied to an edge of the external lens in an area which is subsequently removed during shaping.

14. The process according to claim 12, wherein orienting the external lens comprises detecting the reference and rotating the external lens if not correctly oriented with a polarization axis of the photochromic lens.

15. The process according to claim 14, wherein detecting the reference comprises detecting with a system comprising a camera.

16. The process according to claim 12, wherein:
orienting the external lens comprises orienting the external lens with a polarization axis of the photochromic lens; and
the process further comprises orienting the internal lens with the polarization axis of the photochromic lens after supplying the internal lens.

17. The process according to claim 1, wherein supplying the polarizing film from the reel comprises collecting a protection support on a separate reel as the protection support is removed from the polarizing film.

18. The process according to claim 1, wherein the polarizing film has at least one additional functional property selected from the group consisting of UV-blocking, high polarizing efficiency, and black-crossing.

19. The process according to claim 1, wherein the adhesive has at least one additional functional property selected from the group consisting of UV-blocking, polarizing film aging and discoloration protection, shock resistance, delamination resistance, and capability of being catalyzed by non-UV radiation.

20. The process according to claim 1, wherein the adhesive is capable of being catalyzed by non-UV radiation.

21. The process according to claim 1, wherein the process is accomplished with a system that comprises:
a rigid support for supporting one or more lenses during the process;
said measuring device provided on the rigid support for measuring the thickness of the adhesive; and
a presser for the compressing the adhesive between two or more of the external lens, the polarizing film, and the internal lens.

* * * * *